(12) United States Patent
Yuan

(10) Patent No.: US 8,083,278 B2
(45) Date of Patent: Dec. 27, 2011

(54) MULTI-FINGERED ROBOTIC HAND

(75) Inventor: Hui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 10 days.

(21) Appl. No.: 12/699,834

(22) Filed: Feb. 3, 2010

(65) Prior Publication Data

US 2011/0074172 A1    Mar. 31, 2011

(30) Foreign Application Priority Data

Sep. 30, 2009    (CN) .......................... 2009 1 0308050

(51) Int. Cl.
*B66C 1/00* (2006.01)
(52) U.S. Cl. ........................................ 294/106; 294/111
(58) Field of Classification Search .................. 294/106, 294/111; 623/62, 64; 901/31, 32, 34, 36, 901/38, 39; 414/729; 318/568.11
See application file for complete search history.

(56) References Cited

U.S. PATENT DOCUMENTS

| 1,507,682 A | * | 9/1924 | Pecorella et al. ............... 623/62 |
| 5,062,855 A | * | 11/1991 | Rincoe .............................. 623/24 |
| 5,200,679 A | * | 4/1993 | Graham .................... 318/568.16 |

FOREIGN PATENT DOCUMENTS

| CN | 101474794 | 7/2009 |
| JP | 200442214 | 2/2004 |

* cited by examiner

*Primary Examiner* — Saul Rodriguez
*Assistant Examiner* — Gabriela Puig
(74) *Attorney, Agent, or Firm* — Altis Law Group, Inc.

(57) ABSTRACT

A multi-fingered robotic hand comprises a base, a rotation member rotatably connected to an end of the base, a driving means, and a plurality of digits. The driving means is configured for driving the rotation member to rotate. Each digit comprises a proximal phalanx, a middle phalanx and a first transmission member. The proximal phalanx is connected to the rotation member. The middle phalanx is rotatably connected to the proximal phalanx. The first transmission member includes two ends respectively attached to the proximal phalanx and the middle phalanx, wherein the first transmission member is configured for transmitting rotation of the proximal phalanx to the middle phalanx.

14 Claims, 5 Drawing Sheets

MULTI-FINGERED ROBOTIC HAND

BACKGROUND

1. Technical Field

The present disclosure relates to robotic hands and, more particularly, to a multi-fingered robotic hand.

2. Description of Related Art

Manipulable hand-like apparatuses are utilized in several industries. One such apparatus is a multi-fingered robotic hand. The multi-fingered robotic hand includes a plurality of digits capable of performing certain grasping operations. The multi-fingered robotic hand generally includes a plurality of motors to drive the digits. However, the structure of the robotic hand tends to be complicated and fraught with associated design problems with manufacturing process simplicity and cost implications.

Therefore, a new type of robotic hand is required to overcome the above-mentioned problems.

BRIEF DESCRIPTION OF THE DRAWINGS

The components in the drawings are not necessarily drawn to scale, the emphasis instead being placed upon clearly illustrating the principles of the multi-fingered robotic hand. Moreover, in the drawings, like reference numerals designate corresponding parts throughout the several views.

DETAILED DESCRIPTION

Figure 1:
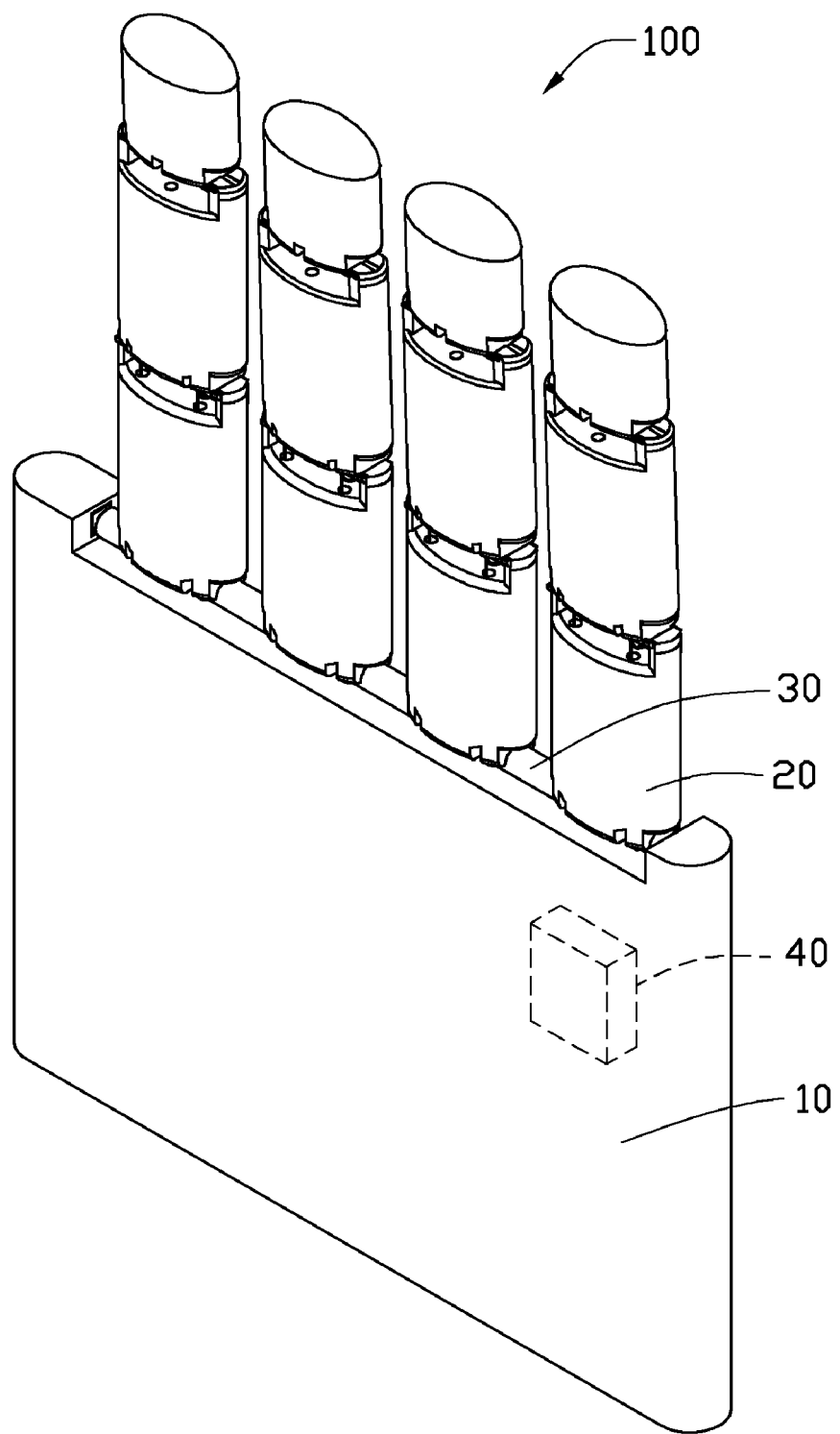
FIG. 1 is an isometric view of a multi-fingered robotic hand in accordance with an exemplary embodiment.

Referring to FIG. 1, a robotic hand 100 includes a base 10, a plurality of digits 20, and a rotation member 30. The rotation member 30 is rotatably connected to the base 10. The digits 20 are fixedly connected to the rotation member 30, which enables the digits 20 to rotate relative to the base 10. The rotation member 30 is driven by a driving means 40, such as an electrical motor. Although not shown, the robotic hand 100 may also include a transmission device that is coupled to the driving means 40 and the rotation member 30. The transmission device may be used to transmit the rotational motion from the driving means 40 to the rotation member 30.

Figure 2:
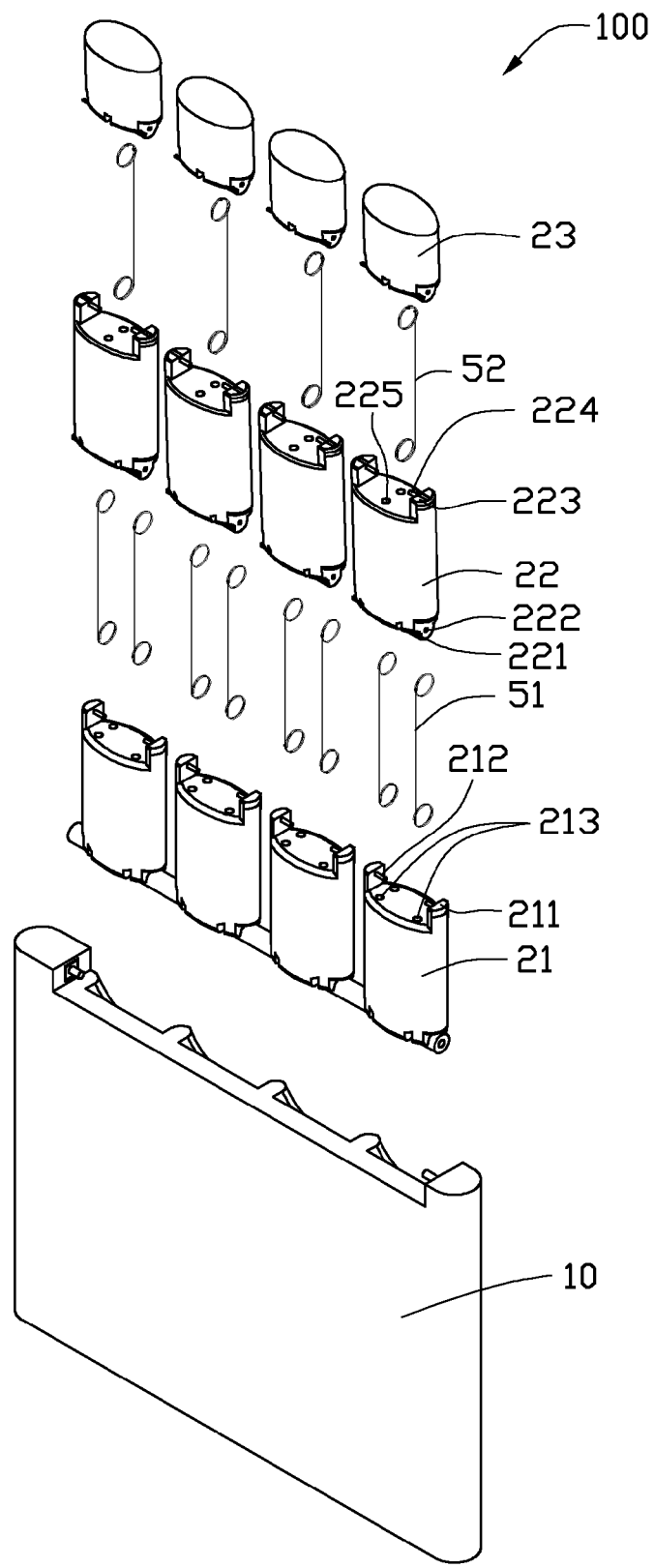
FIG. 2 is an exploded, isometric view of the robotic hand shown in FIG. 1.
Figure 3:
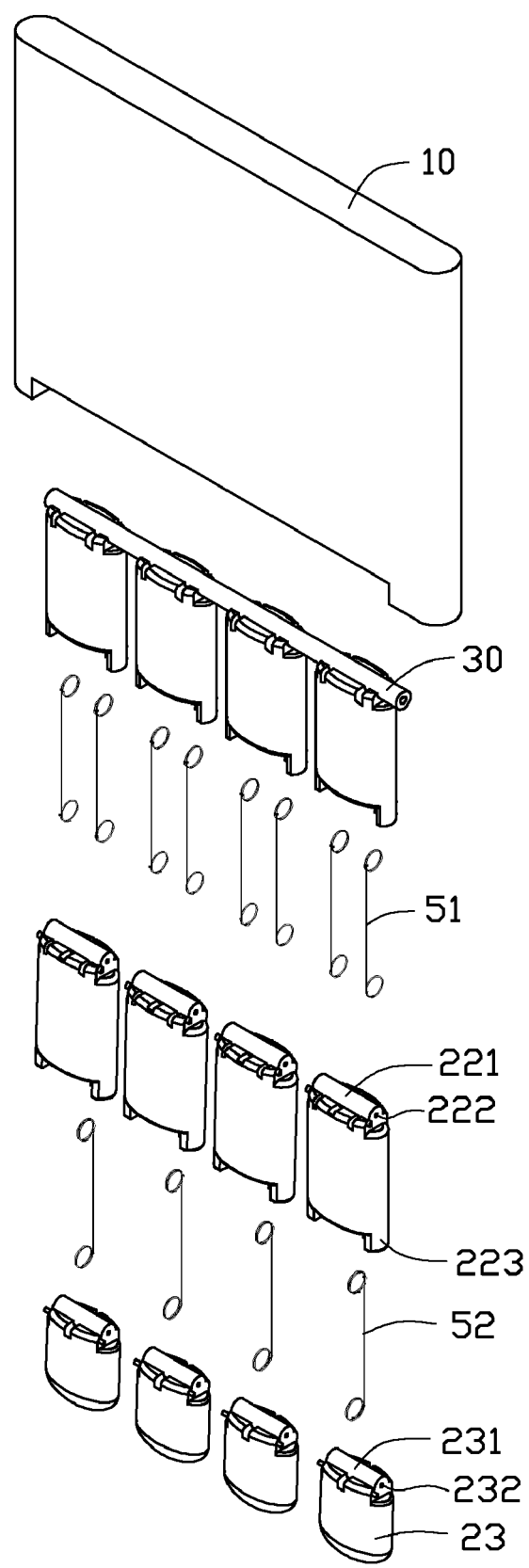
FIG. 3 is another exploded, isometric view of the robotic hand shown in FIG. 1, viewed from another aspect.

Referring to FIGS. 2 and 3, each of the digits 20 is constructed in the same manner and resembles fingers of a human hand, which includes a proximal phalanx 21, a middle phalanx 22, and a distal phalanx 23. One end of the proximal phalanx 21 is fixedly connected to the rotation member 30. The other end of the proximal phalanx 21 includes two tabs 211 protruding therefrom. The two tabs 211 are spaced from each other. A pair of first axles 212 is formed on opposite faces of the tabs 211, respectively. The axles 212 are used for cooperating with an axle receiver to allow a rotational movement between the proximal phalanx 21 and the middle phalanx 22, which will be described in detail later.

One end of the middle phalanx 22 opposite the proximal phalanx 21 includes an axle receiver 221. The axle receiver 221 extends along the width of the middle phalanx 22 and defines an axle aperture 222. The axle aperture 222 is adapted to receive the axles 212 on the proximal phalanx 21, such that the middle phalanx 22 can rotate relative to the proximal phalanx 21. The middle phalanx 22 also includes two tabs 223 formed at the other end thereof. Each tab 223 is provided with a second axle 224. Similarly, the axles 224 are used for cooperating with an axle receiver to allow a rotational movement between the middle phalanx 22 and the distal phalanx 23, which will be described in detail later.

One end of the distal phalanx 23 opposite the middle phalanx 22, includes an axle receiver 231. The axle receiver 231 defines an axle aperture 232 adapted to receive the axles 224 on the middle phalanx 22, such that the distal phalanx 23 can rotate relative to the middle phalanx 22.

In the exemplary embodiment, each digit 20 also includes two first transmission members 51 and a second transmission member 52. The first transmission members 51 are used to transmit a rotational movement from the rotation member 30 to the middle phalanx 22. Similarly, the second transmission member 52 is used to transmit a rotational movement from the middle phalanx 22 to the distal phalanx 23. In the exemplary embodiment, the first transmission members 51 and the second transmission member 52 are cables.

To receive the two cables 51, a pair of through holes 213 is defined in the proximal phalanx 21. The through holes 213 extend along the entire length of the proximal phalanx 21. First ends of the cables 51 are wound on the rotation member 30 and the other ends are wound on the axle receiver 221. When the rotation member 30 rotates in a positive direction, the cables 51 are wound onto the rotation member 30 and unwound from the axle receiver 221. The middle phalanx 22 is then pulled by the cables 51 to rotate with respect to the proximal phalanx 21.

Similarly, a through hole 225, which is adapted to receive the cable 52, is defined in the middle phalanx 22. Two ends of the cable 52 are wound on the axle receivers 221 and 231. When the middle phalanx 22 rotates, the cable 52 is wound onto the axle receiver 221, and then unwound from the axle receiver 231. The distal phalanx 23 is then pulled to rotate relative to the middle phalanx 22. Therefore, when the rotation member 30 rotates in a positive direction, the phalanxes 21, 22, and 23 rotate toward the base 10. An object can then be clamped by the phalanxes 21, 22, and 23 and the base 100.

Figure 4:
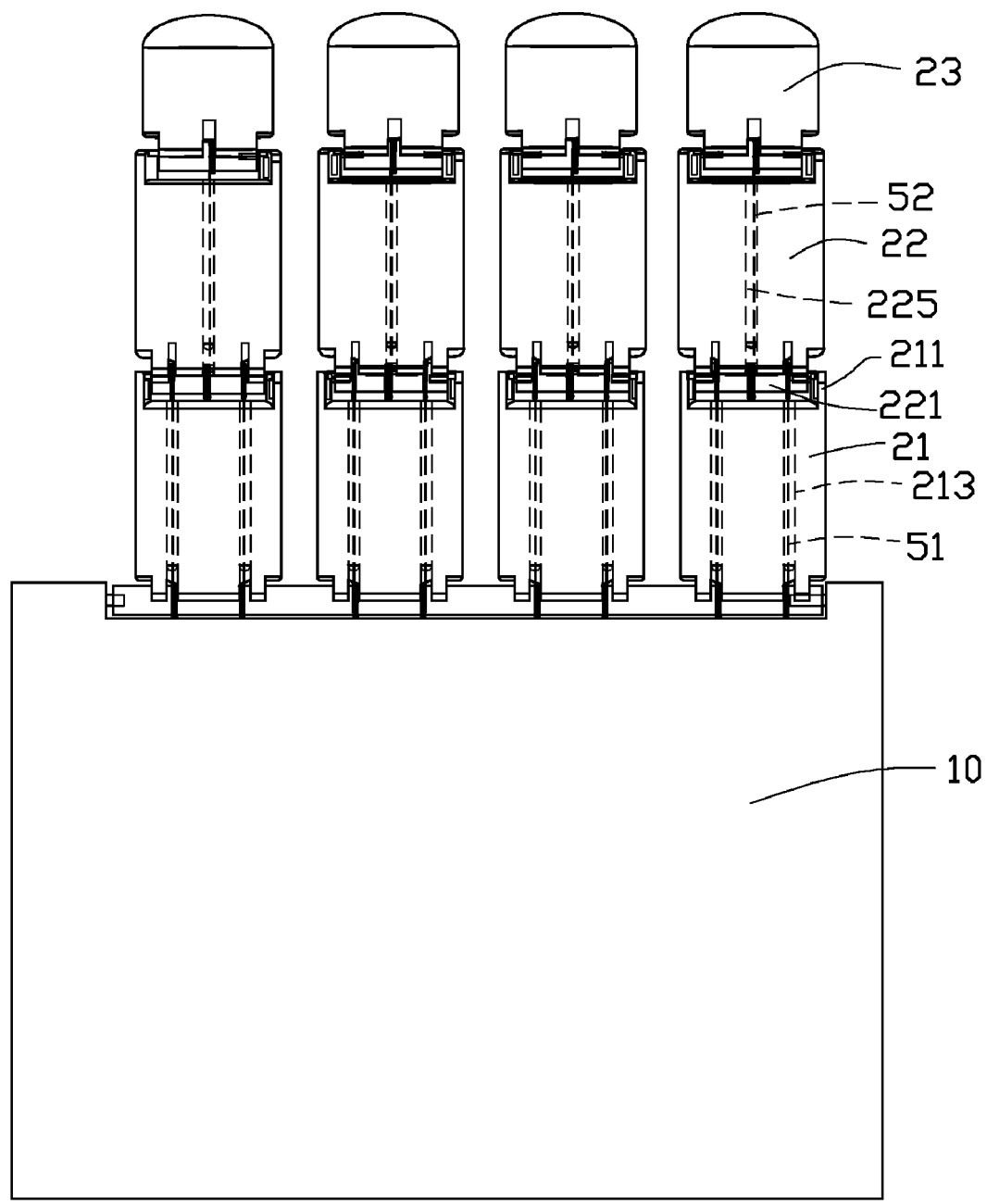
FIG. 4 is a front planar view of the robotic hand shown in FIG. 1.
Figure 5:
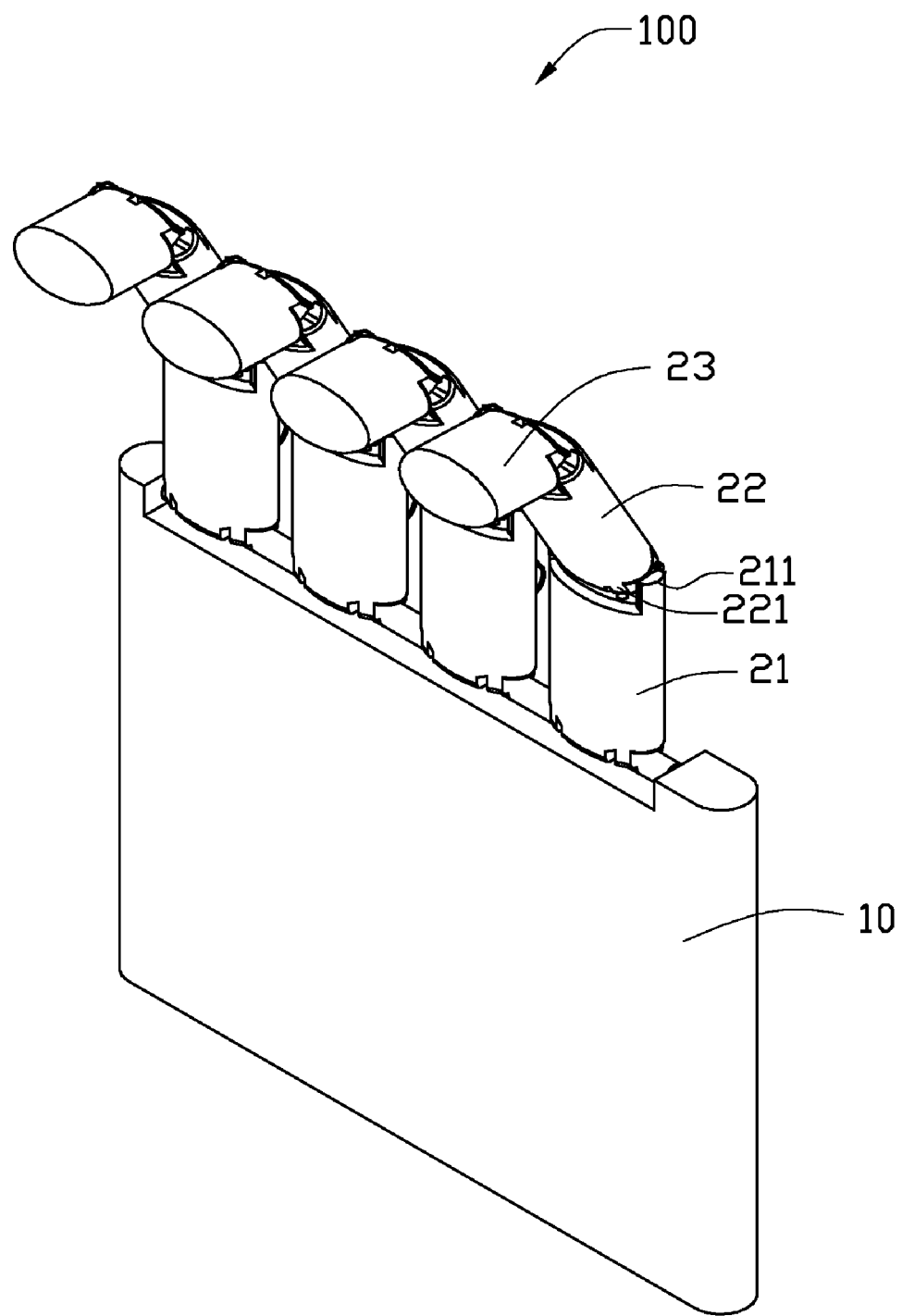
FIG. 5 is another isometric view of robotic hand shown in FIG. 1, which shows a grasping state of the robotic hand.

Referring to FIGS. 4 and 5, in the exemplary embodiment, the proximal phalanx 21 and the middle phalanx 22 are made of magnetic material. The ends of the proximal phalanx 21 and the middle phalanx 22 that are connected together have the same magnetic polarity and so repel each other. Together, the ends form a primary restoring mechanism. By design, the ends can create sufficient repelling force that the middle phalanx 22 tends to return to or remain in original position when not being driven to participate in grasping an object.

Similarly, the distal phalanx 23 is also made of magnetic material. The ends of the middle phalanx 22 and the distal phalanx 23 that are connected together have the same magnetic polarity and together form a second restoring mechanism. The second restoring mechanism causes the distal phalanx 23 to return to or remain in an original position when not driven to participate in grasping an object. In addition, when the middle phalanx 22 rotates back to the original position when driving force ceases, the cables 51 are pulled to be wound onto the axle receiver 221 and unwound from the axle receiver 211, which causes the rotation member 30 to rotate back to its original position.

It is noteworthy that the first and second restoring mechanisms are not limited to the above-described. When necessary, for example, the first and second restoring mechanisms may be coil springs attached to the phalanx 21, 22, and 23.

While one embodiment has been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A multi-fingered robotic hand comprising:
   a base;
   a rotation member rotatably connected to an end of the base;
   a driving means for driving the rotation member to rotate; and
   a plurality of digits, each digit comprising:
      a proximal phalanx connected to the rotation member;
      a middle phalanx rotatably connected to the proximal phalanx; and
      at least one first transmission member including two ends respectively attached to the proximal phalanx and the middle phalanx, wherein the at least one first transmission member is configured for transmitting rotation of the proximal phalanx to the middle phalanx, the proximal phalanx comprises a distal end opposite to the rotation member, a pair of projections protrudes out from the distal end and are spaced from each other, each projection comprises an axle, and the middle phalanx includes an axle receiver configured for receiving the axles to allow a rotation between the proximal phalanx and the middle phalanx.

2. The multi-fingered robotic hand according to claim 1, wherein the at least one first transmission member is a cable, and two ends of the cable are wound on the rotation member and the axle receiver, respectively.

3. The multi-fingered robotic hand according to claim 1, further comprising a distal phalanx and a second transmission member, wherein the distal phalanx is rotatably connected to the middle phalanx, and the second transmission member is configured for transmitting rotation of the middle phalanx to the distal phalanx.

4. The multi-fingered robotic hand according to claim 3, wherein the middle phalanx comprises a distal end opposite to the proximal phalanx, a pair of projections protrudes out from the distal end and are spaced from each other, each projection comprises an axle, and the distal phalanx includes an axle receiver configured for receiving the axles to allow a rotation between the middle phalanx and the distal phalanx.

5. The multi-fingered robotic hand according to claim 4, wherein the second transmission member is a cable, and two ends of the cable are wound on the axle receiver of the middle phalanx and the axle receiver of distal phalanx, respectively.

6. The multi-fingered robotic hand according to claim 3, further comprising a second restoring mechanism configured for returning the distal phalanx to an original orientation after the driving means has ceased driving.

7. The multi-fingered robotic hand according to claim 6, wherein the middle phalanx and the distal phalanx are made of magnetic material, and ends of the middle phalanx and the distal phalanx that are connected together have the same magnetic polarity, which forms the second restoring mechanism.

8. The multi-fingered robotic hand according to claim 3, wherein the number of the at least one first transmission member is two.

9. The multi-fingered robotic hand according to claim 1, wherein the rotation member and the proximal phalanx are integrally formed.

10. The multi-fingered robotic hand according to claim 1, further comprising a first restoring mechanism configured for returning the middle phalanx to an original orientation after the driving means has ceased driving.

11. The multi-fingered robotic hand according to claim 10, wherein the proximal phalanx and the middle phalanx are made of magnetic material, and ends of the proximal phalanx and the middle phalanx that are connected together have the same magnetic polarity, which forms the first restoring mechanism.

12. A multi-fingered robotic hand comprising:
   a base;
   a rotation member rotatably connected to an end of the base;
   a driving means for driving the rotation member to rotate; and
   a plurality of digits, each digit comprising:
      a proximal phalanx connected to the rotation member;
      a middle phalanx rotatably connected to the proximal phalanx; and
      at least one first transmission member configured to transmit rotation of the proximal phalanx to the middle phalanx;
   wherein the proximal phalanx comprises a distal end opposite to the rotation member, the distal end comprises two axles, and the middle phalanx comprises an axle receiver configured to receive the two axles to allow a rotation between the proximal phalanx and the middle phalanx.

13. A multi-fingered robotic hand comprising:
   a base;
   a rotation member rotatably connected to an end of the base;
   a driving means for driving the rotation member to rotate; and
   a plurality of digits, each digit comprising:
      a proximal phalanx connected to the rotation member;
      a middle phalanx rotatably connected to the proximal phalanx;
      a distal phalanx rotatably connected to the middle phalanx;
      at least one first transmission member including two ends respectively attached to the proximal phalanx and the middle phalanx, wherein the at least one first transmission member is configured for transmitting rotation of the proximal phalanx to the middle phalanx; and
      a second transmission member configured for transmitting rotation of the middle phalanx to the distal phalanx;
      wherein the middle phalanx comprises a distal end opposite to the proximal phalanx, a pair of projections protrudes out from the distal end and are spaced from each other, each projection comprises an axle, and the distal phalanx includes an axle receiver configured for receiving the axles to allow a rotation between the middle phalanx and the distal phalanx.

14. The multi-fingered robotic hand according to claim 13, wherein the second transmission member is a cable, and two ends of the cable are wound on the axle receiver of the middle phalanx and the axle receiver of distal phalanx, respectively.

* * * * *